(12) United States Patent
    Arnitz (10) Patent No.: US 9,280,692 B2
(45) Date of Patent: Mar. 8, 2016

(54) METHOD AND RFID READER FOR EVALUATING A DATA STREAM SIGNAL IN RESPECT OF DATA AND/OR COLLISION

(75) Inventor: Daniel Arnitz, Kapfenberg (AT)

(73) Assignee: NXP B.V., Eindhoven (NL)

( * ) Notice: Subject to any disclaimer, the term of this patent is extended or adjusted under 35 U.S.C. 154(b) by 1379 days.

(21) Appl. No.: 12/064,390

(22) PCT Filed: Aug. 25, 2006

(86) PCT No.: PCT/IB2006/052955
    § 371 (c)(1),
    (2), (4) Date: Feb. 21, 2008

(87) PCT Pub. No.: WO2007/023472
    PCT Pub. Date: Mar. 1, 2007

(65) Prior Publication Data
    US 2008/0231424 A1   Sep. 25, 2008

(30) Foreign Application Priority Data

Aug. 25, 2005  (EP) .................................... 05107806

(51) Int. Cl.
    *H04Q 5/22*      (2006.01)
    *G06K 7/00*      (2006.01)
    *G06K 7/10*      (2006.01)
(52) U.S. Cl.
    CPC .......... *G06K 7/0008* (2013.01); *G06K 7/10029* (2013.01)
(58) Field of Classification Search
    CPC ............ G06K 7/0008; G06K 19/0723; G06K 19/07749; G06Q 10/08; G06Q 10/087; H04L 25/062; H04L 25/063; H04L 25/064

USPC ......... 340/10.1, 10.2, 551, 552, 572.1, 572.4; 375/150, 316, 317, 343
See application file for complete search history.

(56) References Cited

U.S. PATENT DOCUMENTS

| | | | | |
|---|---|---|---|---|
| 4,783,658 A * | 11/1988 | Nakano et al. | ................ | 340/10.3 |
| 5,300,922 A * | 4/1994 | Stoffer | ........................ | 340/572.1 |
| 5,566,074 A * | 10/1996 | Hammer | ........................ | 701/301 |
| 5,909,178 A * | 6/1999 | Balch et al. | ................. | 340/572.4 |
| 6,028,503 A * | 2/2000 | Preishuberpflugl et al. | . | 340/10.4 |
| 6,566,997 B1 * | 5/2003 | Bradin | ......................... | 340/10.2 |

(Continued)

FOREIGN PATENT DOCUMENTS

| | | |
|---|---|---|
| CN | 1447954 A | 10/2003 |
| CN | 1484187 A | 3/2004 |

(Continued)

OTHER PUBLICATIONS

English Abstract of JP 60-208145.

(Continued)

*Primary Examiner* — Brian Zimmerman
*Assistant Examiner* — An T Nguyen (57) ABSTRACT

A method for evaluating, by an radio frequency identification reader (1), a data stream signal (DS) in respect of data and/or collision, comprises comparing the data stream signal (DS) with at least one threshold level, particularly a data bit level and/or a collision level, and evaluating the results of the comparison, wherein both the threshold level and its adaptation speed ($\alpha(n)$) are adapted in dependence of the course of the data stream signal (DS) and/or the course of said threshold level.

10 Claims, 6 Drawing Sheets

(56) References Cited

U.S. PATENT DOCUMENTS

| | | |
|---|---|---|
| 6,952,167 B2 | 10/2005 | Wakabayashi |
| 7,072,618 B1* | 7/2006 | Strutt .................... 455/67.13 |
| 7,088,246 B2 | 8/2006 | Fukuoka |
| 7,604,177 B2* | 10/2009 | Konuma et al. ............ 235/492 |
| 7,626,919 B2 | 12/2009 | Miyoshi et al. |
| 7,649,441 B2* | 1/2010 | Adamec et al. ............ 340/10.2 |
| 7,817,015 B1* | 10/2010 | Tiernay et al. ............ 340/10.4 |
| 8,077,010 B2* | 12/2011 | Kato ........................ 340/5.61 |
| 8,120,469 B2* | 2/2012 | Adamec et al. ............ 340/10.2 |
| 2004/0036606 A1 | 2/2004 | Frederick et al. |
| 2004/0069852 A1 | 4/2004 | Seppinen et al. |
| 2004/0179588 A1* | 9/2004 | Kuffner et al. ............ 375/224 |
| 2004/0246100 A1 | 12/2004 | Kranz |
| 2005/0064817 A1* | 3/2005 | Ginzburg .................. 455/41.2 |
| 2005/0201450 A1* | 9/2005 | Volpi et al. ................ 375/150 |
| 2006/0186995 A1* | 8/2006 | Wu et al. .................. 340/10.1 |
| 2006/0238301 A1* | 10/2006 | Wu et al. .................. 340/10.1 |
| 2007/0109129 A1* | 5/2007 | Sundstrom et al. ........ 340/572.2 |
| 2007/0120676 A1* | 5/2007 | Park et al. ................ 340/572.4 |
| 2007/0129039 A1* | 6/2007 | Sherrets .................... 455/230 |
| 2008/0024280 A1* | 1/2008 | Kato ........................ 340/10.3 |
| 2008/0106381 A1* | 5/2008 | Adamec et al. ............ 340/10.2 |
| 2008/0231424 A1* | 9/2008 | Arnitz ...................... 340/10.1 |

FOREIGN PATENT DOCUMENTS

| | | |
|---|---|---|
| JP | 60-208145 A | 10/1985 |
| JP | 10-256994 | 9/1998 |
| JP | 2000-278334 A | 10/2000 |
| JP | 2004-266336 A | 9/2004 |
| WO | 02/077940 A1 | 10/2002 |

OTHER PUBLICATIONS

Certificate of Patent for Invention for foreign counterpart CN Patent No. ZL200680030718.9 (Jun. 23, 2010).

Notice of Grant for foreign counterpart JP Patent Appl. 2008-527579 (Feb. 2, 2011).

* cited by examiner

METHOD AND RFID READER FOR EVALUATING A DATA STREAM SIGNAL IN RESPECT OF DATA AND/OR COLLISION

FIELD OF THE INVENTION

The invention relates to a method for evaluating by a radio frequency identification reader a data stream signal in respect of data and/or collision, comprising comparing the data stream signal with at least one threshold level, particularly a data bit level and/or a collision level, and evaluating the results of the comparison.

The invention further relates to a radio frequency identification reader being configured to evaluate a data stream signal in respect of data and/or collision, by comparing the data stream signal with at least one threshold level, particularly a data bit level and/or a collision level, and evaluating the results of the comparison.

The invention further relates to a computer program product directly loadable into the memory of a programmable radio frequency identification reader, comprising software code portions for performing the steps of a method according to the first paragraph when said product is run on the radio frequency identification reader.

BACKGROUND OF THE INVENTION

In known Radio Frequency IDentification (RFID) systems fixed threshold levels are used for detecting data and collisions in data stream signals received by an RFID reader. In this context, the term "fixed threshold levels" means that said threshold levels are either set in advance or are selected as a predefined multiple of an input noise signal.

However, these known RFID systems have shown the disadvantage that in case of varying signal levels the threshold levels used for the detection of data and collisions cannot be adapted, which may result in detection errors. Varying signal levels may for instance arise from signal beat or from varying coupling between the antennas of an RFID reader and RFID tags, respectively.

From the document U.S. Pat. No. 5,300,922 a periodic pulse discrimination system for use with electronic article surveillances systems is known which is capable of detecting valid tag pulses while discriminating against periodic pulses caused by resonances and interfering carriers as well as random noise. Circuitry that determines the periodicity of a pulse signal and is responsive to amplitude differences between successive detected pulses controls an adaptive threshold and sampling window to discriminate against signals having an incorrect periodicity and an inadequate envelope rise time. This document generally discusses topics in respect of adaptive detection of periodic signals and noise, but does not disclose processes or means for detecting data and collisions in data stream signals among the signals of multiple RFID tags by use of adaptive threshold levels.

OBJECT AND SUMMARY OF THE INVENTION

It is an object of the invention to provide a method of the type defined in the opening paragraph and a device of the type defined in the second paragraph, in which the disadvantages defined above are avoided.

In order to achieve the object defined above, with a method according to the invention characteristic features are provided so that a method according to the invention can be characterized in the way defined below, that is:

A method for evaluating by an radio frequency identification reader a data stream signal in respect of data and/or collision, comprising comparing the data stream signal with at least one threshold level, particularly a data bit level and/or a collision level, and evaluating the results of the comparison, wherein both the threshold level and its adaptation speed are adapted in dependence of the course of the data stream signal and/or the course of said threshold level.

In order to achieve the object defined above, with an RFID reader according to the invention characteristic features are provided so that the RFID reader carries out the steps of the method according to the present invention.

In order to achieve the object defined above, with a computer program product according to the invention characteristic features are provided so that a computer program product according to the invention is directly loadable into the memory of a programmable RFID reader, wherein the computer program product comprises software code portions for performing the steps of a method according to the invention when said product is run on the RFID reader.

In order to achieve the object defined above, an RFID reader according to the invention comprises an arithmetic-logic unit and a memory and processes the computer program product according to the above paragraph.

The characteristic features according to the invention provide a substantial improvement of the detection rate and speed of data and collisions in data stream signals of RFID readers. The present invention is of particular advantage for RFID systems that are operated in environments and/or under such conditions wherein the signal levels may change over time. This may be due to antenna detuning, noise or changes of the magnetic coupling between RFID reader and RFID tags.

The measures as claimed in claim 2 provide the advantage that with an appropriately set basic adaptation speed a fast initial adaptation of the threshold levels can be achieved. The basic adaptation speed may be varied over time, thus enabling learning modes. This may be done using a learning curve.

The measures as claimed in claim 3 or claim 4, respectively, provide the advantage that the threshold levels can be adapted faster if samples of the data stream signal have a high variance, or can be frozen if the variance is too high.

The measures as claimed in claim 5 provide the advantage that an adaptation of bit level to collisions or outliers is prevented. Further, quick adaptation of the threshold levels to steps can be achieved.

The measures as claimed in claim 6 provide the advantage that adaptation of the threshold levels is selectively activated or deactivated. For example a "1" bit level should not try to adapt to "0" sample values. Further, adaptation can be prevented when the distance of an actual sample value of the data stream signal to the threshold level is too high.

The measures as claimed in claim 7 provide the advantage that interferences can be handled that cause increased signal levels in case of signal collision.

The measures as claimed in claim 8 provide the advantage that a quick decision can be made whether in case of signal collision the data can be recovered or not.

It should further be noted that the features of the inventive method can be directly implemented in the RFID reader.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
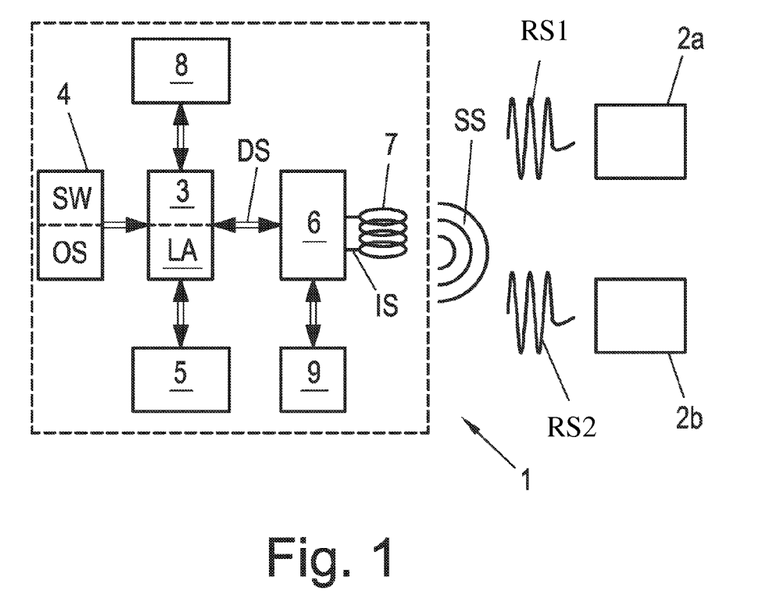
FIG. 1 shows a schematic block circuit diagram of an RFID system.

FIG. 1 shows a schematic block circuit diagram of an RFID (Radio Frequency Identification) system comprising an RFID reader 1 and a number of RFID tags 2a, 2b, wherein, for the sake of clearness, only two RFID tags 2a and 2b are depicted. RFID reader 1 communicates with the RFID tags 2a, 2b in a contact-less manner via modulated electromagnetic signals, provided the RFID tags 2a, 2b are within the transmission and receiving range of the RFID reader 1. The RFID reader 1 comprises control means 3, like a microprocessor or microcontroller, which control means 3 communicate via a data bus with program storage means 4. The program storage means 4 is adapted to store an operating system OS for basic operation of the control means 3 and application program code SW to be processed by the control means 3. The program storage means 4 may be configured as a non-volatile memory, like a PROM, EPROM, EEPROM or the like, wherein in the present case a ROM utilized. The program storage means 4 may also be configured as a user definable ASIC, PAL or the like. Further, the control means 3 and the program storage means 4 may be integrated into a single chip. It should be observed that the application program code SW and the operating system OS may be integrated. The control means 3 further communicate with a random access memory 5. The control means 3, when processing the program code SW, cooperate with input/output means 8, which e.g. can be configured as a link interface to a computer.

The RFID reader 1 further comprises an antenna 7 for transmitting electromagnetic signals SS to the RFID tags 2a, 2b. These electromagnetic signals SS may be used for both transmitting data to the RFID tags 2a, 2b and energizing the RFID tags 2a, 2b if they are configured as passive tags. The RFID tags 2a, 2b respond to the RFID reader with response signals RS1, RS2. Data exchange between the RFID reader 1 and the RFID tags 2a, 2b may be accomplished by standard data transmission protocols and standard modulation methods. For instance, the electromagnetic signal SS sent from the RFID reader 1 to the RFID tags 2a, 2b is a pulse position coded modulated signal according to the international standard ISO15693 but also other transmission methods may be considered. The response signals RS1, RS2 from the RFID tags 2a, 2b to the RFID reader are e.g. load modulated signals, wherein a carrier signal or sub carrier signal contained in the electromagnetic signal SS is modulated by switching a load impedance connected to the antennas of the RFID tags 2a, 2b, so that varying energy is drawn from the carrier signal or sub-carrier signal. Switching the load impedances at the RFID tags causes a change of the impedance of the antenna 7 of the RFID reader 1 and hence a varying amplitude of the voltage at the antenna 7 of the RFID reader 1, which varying voltage amplitude represents an input signal IS. For recovery of data contained in the input signal IS the input signal IS is rectified or demodulated, respectively, yielding data stream signal DS. The RFID reader 1 extracts the data coded in the data stream signal DS by comparing it with defined bit levels. In order to reduce the errors in extracting the data collision levels can be defined additionally and used for comparison, as will be explained in detail below.

Figure 2:
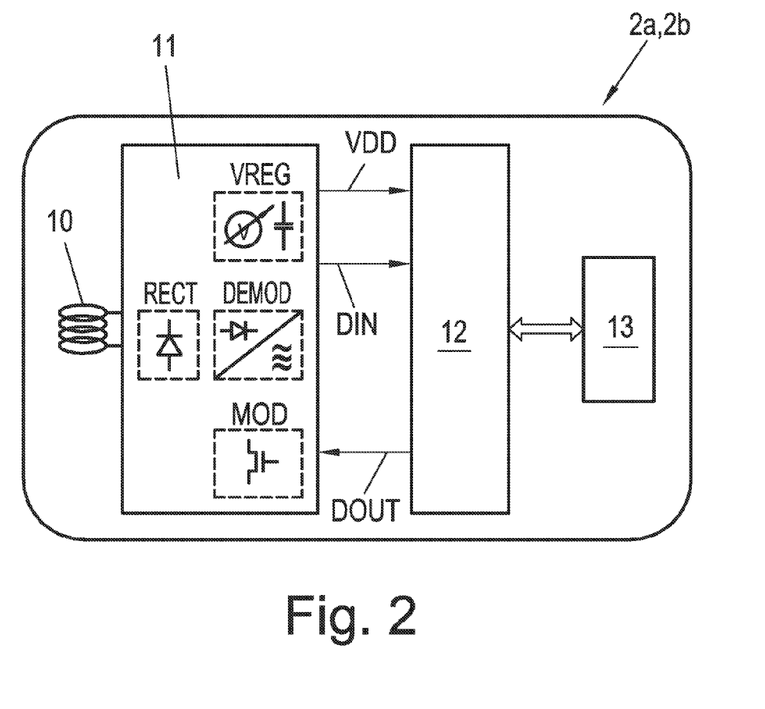
FIG. 2 shows a schematic block circuit diagram of an RFID tag.

FIG. 2 shows a schematic block circuit diagram of an exemplary embodiment of the RFID tags 2a, 2b. It should be observed that the configuration of the RFID tags 2a, 2b is not part of the present invention, but is explained only for a comprehensive understanding of the present invention. Each RFID tag 2a, 2b is configured as a passive tag and comprises an antenna 10, an analogue radio frequency interface 11 that is connected to the antenna 10, a digital control unit 12 that is connected to the analogue radio frequency interface 11, and a memory 13 that is connected to the digital control unit 12. The memory 13 is a non-volatile memory, like an EEPROM, so that data that are written into the memory 13 during communication with the RFID reader 1 remain stored even when the RFID tag 2a, 2b is switched off, e.g. because it leaves the transmitting range of the RFID reader 1 and is therefore not longer energized by the RFID reader 1. Memory 13 may also contain program code for operating the digital control unit 12 and a unique identification number. Antenna 10 receives the electromagnetic signals SS from the RFID reader 1 and passes them to the analogue radio frequency interface 11. In general, the analogue radio frequency interface 11 comprises a rectifier REG and a voltage regulator VREG with integrated energy storage element, like a capacitor, to derive from the received electromagnetic signals SS the necessary operating voltage VDD for the digital control unit 12 and the memory 13. Further, analogue radio frequency interface 11 comprises a demodulator DEMOD to extract data DIN from the electromagnetic signals SS and to pass them to the digital control unit 12. Digital control unit 12 processes the received data DIN and may respond to the RFID reader 1 by creating output data DOUT and passing them to the analogue radio frequency interface 11. Analogue radio frequency interface 11 comprises a modulator MOD that modulates the output data DOUT and transmits the modulated signals as response signals RS1, RS2 via antenna 10.

For a successful communication between the RFID reader 1 and the RFID tags 2a, 2b it is necessary to frequently carry out synchronization between said devices. Further, in frequent time intervals the RFID reader searches for RFID tags being present in its receiving range by sending out broadcast inventory commands, requesting all RFID tags to confirm their presence by returning their identification numbers. This inventory process may result in signal collisions at the antenna 7 of the RFID reader, when more than one RFID tag respond at the same time, as will now be explained with reference to the diagrams of FIGS. 3 and 4.

Figure 3:
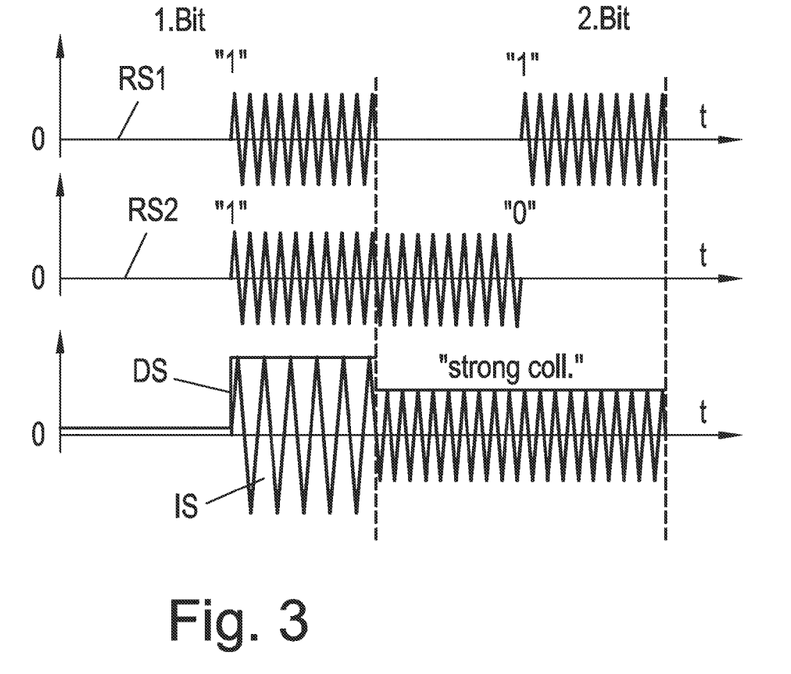
FIG. 3 shows a signal diagram explaining strong signal collision.

The diagram depicted in FIG. 3 shows in the upper two lines response signals RS1, RS2 transmitted at the same time by RFID tags 2a, 2b. The response signals RS1, RS2 contain the bit streams "1-1" (RS1) and "1-0" (RS2) in Manchester coding. Manchester coding is a form of data communications line coding in which each bit of data is signified by at least one transition. Each bit is transmitted over a predefined time period. Superposition of the response signal RS1, RS2 creates the input signal IS at the antenna of the RFID reader 1 as is depicted in the lowest line of the diagram, which input signal IS is demodulated to data stream signal DS. Regarding input signal IS or data stream signal DS, respectively, it will be appreciated that the first bit still contains a transition, although the signal amplitude has been increased to about twice the signal amplitude of signals RS1, RS2. However, when comparing data stream signal DS with appropriately set bit levels the RFID reader 1 is still able to correctly recover the correct bit values "1" and assign them to response signals RS1, RS2. In contrast thereto, the second bits of signals RS1, RS2 superimpose to a signal form in the input signal IS and the demodulated data stream signal DS, respectively, that has no transition, which is a violation of Manchester coding. This lacking transition constitutes a so-called "strong" collision, since the RFID reader is unable to recover the data bits.

Figure 4:
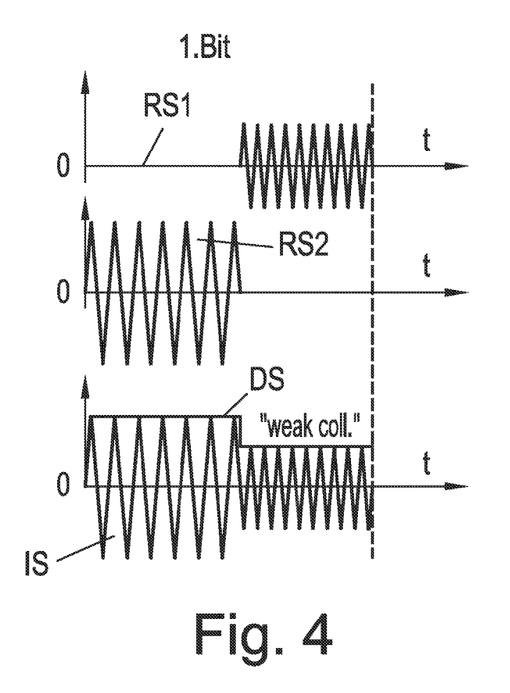
FIG. 4 shows a signal diagram explaining weak signal collision.

The diagram of FIG. 4 shows response signals RS1 and RS2 from RFID tags 2a, 2b as received by the RFID reader. It will be appreciated that the response signals RS1, RS2 appear with different amplitudes at the RFID reader (for instance due to different distances from the RFID reader 1) resulting in an input signal IS and a demodulated data stream signal DS, respectively, as depicted in the lowest line of the diagram. Although superimposing of response signals RS1, RS2 at antenna 7 of the RFID reader 1 causes a signal collision in the data stream signal DS, in this case the collision is only a "weak" one, since the data stream signal DS still shows a signal transition that allows for the correct recovery of the data ("1" for signal RS1, "0" for RS2) provided that the data stream signal DS is compared with appropriately set bit levels.

In order to improve the data detection rate and speed and to reduce the error rate the present invention proposes to use adaptive threshold levels for comparison with the data stream signal DS. Such adaptive threshold levels are useful whenever the values that represent the threshold level change over time. This may be due to antenna detuning, noise or changes of the magnetic coupling (eg. moving vicinity integrated circuit cards (VICC)). In order to achieve best results the present invention further proposes to adapt the threshold levels with an adaptive adaptation speed, as will be explained herein below.

In an embodiment of the present invention adaptation of the threshold levels is based on exponential smoothing. It's adaptation speed α (α, $\alpha_{var}$: 0 ... 1ϵR) is a function of the variance ($L_{var}$), the relative distance of the new sample to the level $$\left(\frac{\text{this} - L(n-1)}{L(n-1)}\right),$$

an external value ($\alpha_0$) and an on/off variable ($\epsilon\{0,1\}$). The term this denotes the actual sample x(n) of the data stream signal DS. The factors F control the weight of each part.

The variance is estimated by the following equations. These equations are basically the same as for the adaptive level itself.

$$\alpha_{var}(n) = \left[\left(\alpha_{0,var}(n) + \frac{|\text{this} - L(n-1)|}{L(n-1)} \cdot F_{\Delta,var}\right) \cdot \text{on/off}(n)\right]_0^1 \quad [\text{EQ 1}]$$

$$L_{var}(n) = \lceil L_{var}(n-1) \cdot (1 - \alpha_{var}(n)) + |\text{this} - L(n-1)| \cdot \alpha_{var}(n) \rceil^{L_{var,max}} \quad [\text{EQ 2}]$$

The maximum variance $L_{var,max}$ prevents divergence effects for positive $F_{\Delta,var}$ (more variance⇒ faster level adaptation⇒ higher misplacement for the next sample⇒ more variance⇒ ...) if set properly.

The main level is calculated as follows:

$$\alpha(n) = \left[\left(\alpha_0(n) + \frac{|\text{this} - L(n-1)|}{L(n-1)} \cdot F_\Delta + \frac{L_{var}(n)}{L(n-1)} \cdot F_{var}\right) \cdot \text{on/off}(n)\right]_0^1 \quad [\text{EQ 3}]$$

$$L(n) = L(n-1) \cdot (1 - \alpha(n)) + \text{this} \cdot \alpha(n) \quad [\text{EQ 4}]$$

The adaptation speed is controlled by various parameters. The following table lists these parameters including a short explanation.

| Parameter | Explanation |
| --- | --- |
| α(n) | Basic adaptation speed. This parameter may be varied ove rtime, thus enabling learning modes. This may be done using a learning curve. If $\alpha_0$ is chosen negative, it forces a slowdown of adaptation. |
| $\frac{L_{var}(n)}{L(n-1)}$ | Variance dependence of the level. This maybe used to let the level adapt faster if input samples have a high variance or to freeze the level if the variance is too high. |
| $\frac{\text{this-L}(n-1)}{L(n-1)}$ | Distance dependence of level to new value. This prevents the level from adapting to collisions or outliers. It may also be used to quickly adapt the level to steps. |
| on/off(n) | This constant ∈ {0, 1} may be used to activate or deactivate the adaptation. For example a "1"-level should not try to adapt to zeros. The constant may also be controlled by |this-L(n − 1)|/L(n − 1). This prevents adaptation in any case if the distance to the level is too high. |
| F | The F-parameters (factors) control the weight of the parts mentioned in this table. The higher the F-value (e.g. FΔ), the more dominant the corresponding part will get. This parameters may also be chosen variable, changing the behavior of the adaptive level over time. |

Next, applications of the present invention are explained by way of examples.

Example 1

In order to discriminate bits "1" and bits "0" in an input signal that is received by the RFID reader from RFID tags a bit threshold level for bit "1" (denoted $L_{"1"}$) and a bit threshold level for bit "0" (denoted $L_{"0"}$) is defined. It is further defined:

$$\text{center}(n) = \text{center}(n-1) \cdot (1 - \alpha_{center}) + \frac{L_{"1"}(n) + L_{"0"}(n)}{2} \cdot \alpha_{center} \quad [\text{EQ 5}]$$

$$\text{on/off}_{"1"}(n) = \begin{cases} 1 & \text{if this} > \text{center}(n-1) \\ 0 & \text{otherwise} \end{cases} \quad [\text{EQ 6}]$$

$$\text{on/off}_{"0"}(n) = \begin{cases} 1 & \text{if this} < \text{center}(n-1) \\ 0 & \text{otherwise} \end{cases} \quad [\text{EQ 7}]$$

Figures 5, 6:
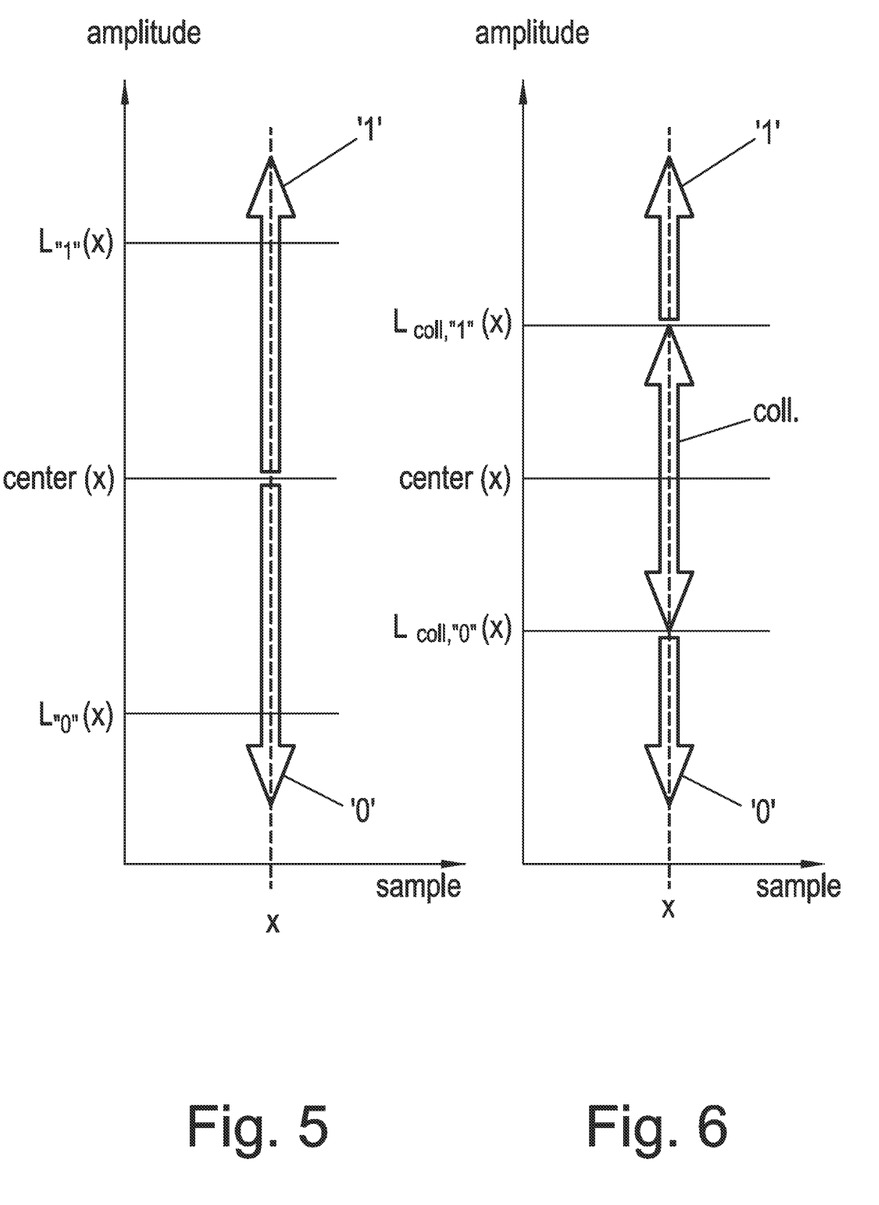
FIG. 5 to FIG. 8 show exemplary diagrams of various adaptive threshold levels defined according to the present invention.

The above threshold levels are shown for a sample x in the diagram of FIG. 5. The bit decision is defined by:

$$\text{Bit}(n) = \begin{cases} 1 & \text{if this} > \text{center}(n) \\ 0 & \text{if this} < \text{center}(n) \\ \text{undefined} & \text{otherwise} \end{cases} \quad [\text{EQ 8}]$$

Example 2

In order to enhance the evaluation of the data stream signal DS in such a way that not only bits "1" and "0" can be discriminated, but also collisions may be found, two collision levels $L_{coll,"1"}(n)$ and $L_{coll,"0"}(n)$, i.e. one for each bit level, are defined according to the following equations:

$$L_{coll,"1"}(n) = L_{"1"}(n) - L_{var,"1"}(n) \cdot F_{coll,"1"} \quad [EQ\ 9]$$

$$L_{coll,"0"}(n) = L_{"0"}(n) + L_{var,"0"}(n) \cdot F_{coll,"0"} \quad [EQ\ 10]$$

The above threshold levels are shown for a sample x in the diagram of FIG. 6. The occurrence of collisions is decided according to the following equation:

$$\text{Collision}(n) = \begin{cases} \text{true} & \text{if } L_{coll,"0"}(n) \leq \text{this} \leq L_{coll,"1"}(n) \\ \text{false} & \text{otherwise} \end{cases} \quad [EQ\ 11]$$

Example 3

It should be noted that interferences may create increased instead of decreased levels in case of collisions. In order to cope with this problem, two additional collision threshold levels have to be introduced, resulting in four collision threshold levels:

$$L_{coll,"1",u}(n) = L_{"1"}(n) + L_{var,"1"}(n) \cdot F_{coll,"1"} \quad [EQ\ 12]$$

$$L_{coll,"1",l}(n) = L_{"1"}(n) - L_{var,"1"}(n) \cdot F_{coll,"0"} \quad [EQ\ 13]$$

$$L_{coll,"0",u}(n) = L_{"0"}(n) + L_{var,"0"}(n) \cdot F_{coll,"0"} \quad [EQ\ 14]$$

$$L_{coll,"0",l}(n) = L_{"0"}(n) - L_{var,"0"}(n) \cdot F_{coll,"0"} \quad [EQ\ 15]$$

Figure 7:
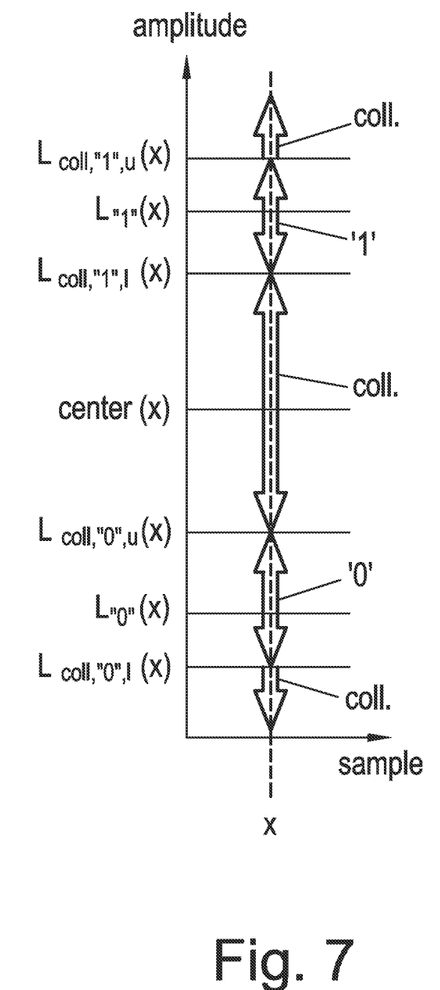

The above threshold levels are shown for a sample x in the diagram of FIG. 7. The occurrence of collisions is decided according to the following equation:

$$\text{Collision}(n) = \begin{cases} \text{true} & \text{if this} \leq L_{coll,"0",l}(n) \\ \text{true} & \text{if } L_{coll,"0",u}(n) \leq \text{this} \leq L_{coll,"1",l}(n) \\ \text{true} & \text{if this} \geq L_{coll,"1",u}(n) \\ \text{false} & \text{otherwise} \end{cases} \quad [EQ\ 16]$$

Example 4

Using two different collision levels per bit level allows the system to discriminate "weak" from "strong" collisions:

$$L_{coll,"1",strong}(n) = L_{"1"}(n) - L_{var,"1"}(n) \cdot F_{coll,"1",strong} \quad [EQ\ 17]$$

$$L_{coll,"1",weak}(n) = L_{"1"}(n) - L_{var,"1"}(n) \cdot F_{coll,"1",weak} \quad [EQ\ 18]$$

$$L_{coll,"0",strong}(n) = L_{"0"}(n) + L_{var,"0"}(n) \cdot F_{coll,"0",strong} \quad [EQ\ 19]$$

$$L_{coll,"0",weak}(n) = L_{"0"}(n) + L_{var,"0"}(n) \cdot F_{coll,"0",weak} \quad [EQ\ 20]$$

Figure 8:
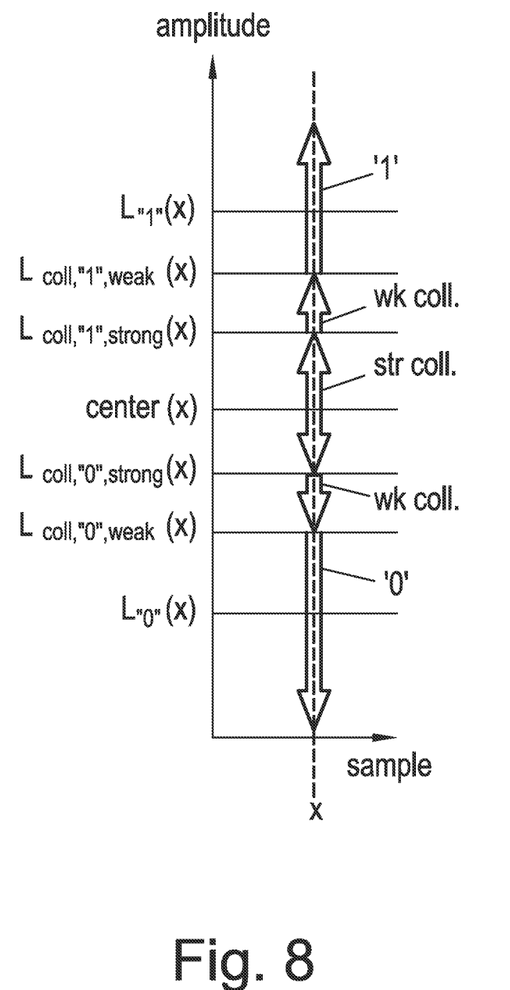

The above threshold levels are shown for a sample x in the diagram of FIG. 8. The occurrence of strong and weak collisions is decided according to the following equation:

$$\text{Strong Collision}(n) = \begin{cases} \text{true} & \text{if } L_{coll,"0",strong}(n) \leq \\ & \text{this} \leq L_{coll,"1",strong}(n) \\ \text{false} & \text{otherwise} \end{cases} \quad [EQ\ 21]$$

$$\text{Weak Collision}(n) = \begin{cases} \text{true} & \text{if } L_{coll,"0",weak}(n) \leq \\ & \text{this} < L_{coll,"0",strong}(n) \\ \text{true} & \text{if } L_{coll,"1",strong}(n) < \\ & \text{this} \leq L_{coll,"1",weak}(n) \\ \text{false} & \text{otherwise} \end{cases} \quad [EQ\ 22]$$

with $F_{coll,"1",strong} > F_{coll,"1",weak}$ and $F_{coll,"0",strong} > F_{coll,"0",weak}$. Combining examples 3 and 4, i.e. defining two collision levels per bit level and weak/strong collision levels, eight collision levels are obtained.

Example 5

Figure 9:
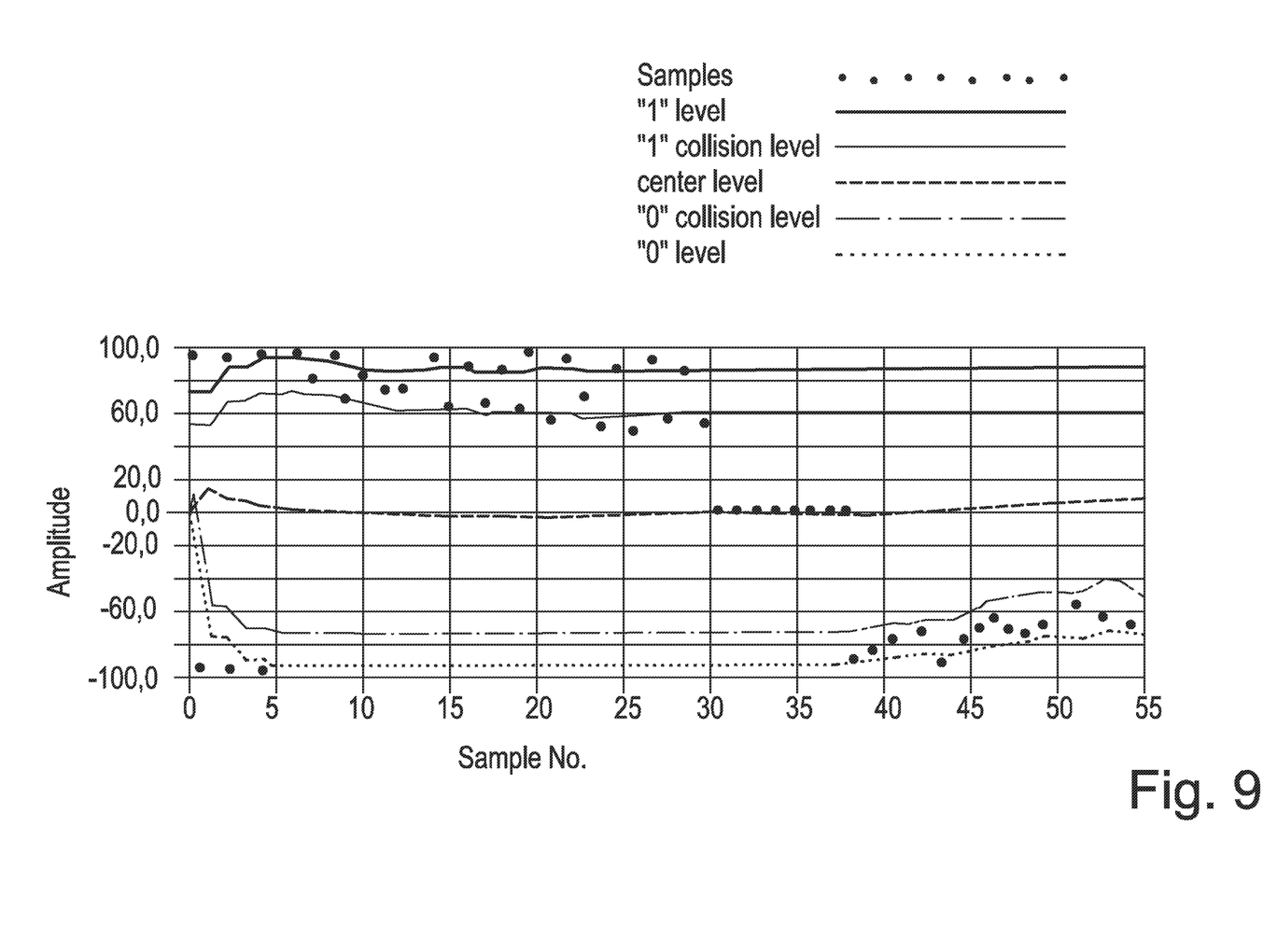
FIG. 9 shows a diagram of the amplitude of samples of a data stream signal and adaptive bit levels and collision levels.

FIG. 9 shows a diagram of the amplitude of samples of a data stream signal DS and adaptive bit levels and collision levels. This example is an implementation of above equations [EQ 1] to [EQ 11], with equations [EQ 6] and [EQ 7] respectively, having been substituted by the following equations:

$$\text{on/off}_{"1"}(n) = \begin{cases} 1 & \text{if this} > L_{coll,"1"}(n-1) \\ 0 & \text{otherwise} \end{cases} \quad [EQ\ 23]$$

$$\text{on/off}_{"0"}(n) = \begin{cases} 1 & \text{if this} < L_{coll,"0"}(n-1) \\ 0 & \text{otherwise} \end{cases} \quad [EQ\ 24]$$

The diagram of FIG. 9 is explained by the following table:

| DS Sample No. | Explanation |
| --- | --- |
| 0-5 | Very fast adaptation controlled by $\alpha_0$ in learning mode. $\alpha_0$ decreases along a cosine rolloff learning pattern. Please note that the "1"-level (positive) will not react to zeros (negative) and vice versa. |
| 6-30 | Only ones with increasing variance. "0"-level is fixed while "1"-level changes at most samples. However, collisions (samples below "1"-collisionlevel) are ignored. |
| 31-38 | Collisions for both levels. All levels are fixed to their previous state. |
| 39-55 | Zeros with decreasing level but increasing variance (eg. VICC is moving out of the field). |

Figure 10:
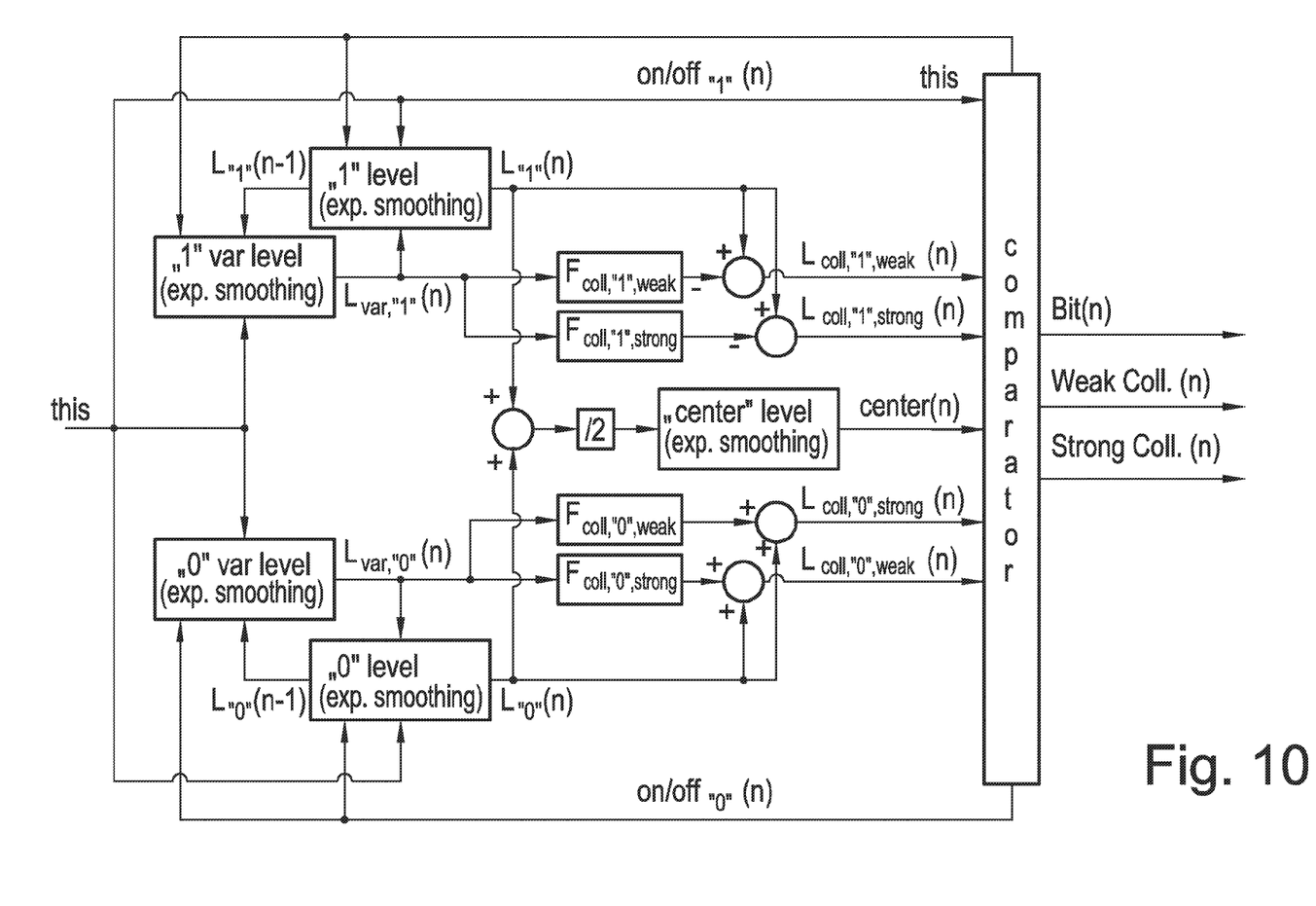
FIG. 10 shows a block circuit diagram of an implementation of the present invention.

FIG. 10 shows a block circuit diagram of an implementation of the present invention. It should be observed that this implementation may be embedded in form of hardware implementation (level adaptation means LA as part of control means 3 of RFID reader 1, see FIG. 1) or software implementation, wherein the software is stored in the program storage means 4 or loadable into the program storage means 4 and/or the memory 5 of the RFID reader 1. In many situations a computer program product that comprises software code portions for performing the steps of the method according to the invention is already pre-stored in such an RFID reader, e.g. in a ROM or EPROM or any other permanent memory. It may also be that the computer program product can be fed into the RFID reader by the aid of a data carrier on which the computer program product is stored.

In the block circuit diagram of FIG. 10 the following associations between blocks and equations are given:
- "1" level: [EQ 3], [EQ 4]
- "0" level: [EQ 3], [EQ 4]
- "1" var level: [EQ 1], [EQ 2]
- "0" var level: [EQ 1], [EQ 2]
- center level: [EQ 5]
- right part: [EQ 17] to [EQ 20]
- comparator: [EQ 5], [EQ 21] to [EQ 24]

It can be mentioned that so called RFID systems are systems used for goods or animal identification. But also so called near field communication devices (NFC devices) can be considered. In general idea of this invention can always be applied for communication systems, in which systems a bit stream and collision detection is required. It allows to make decisions on signals, for which signals the variance of the level (e.g. caused by noise) is a problem during operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for evaluating by a radio frequency identification reader a data stream signal in respect of data and/or collision, comprising comparing the data stream signal with at least one threshold level using the radio frequency identification reader, and evaluating the results of the comparison using the radio frequency identification reader, wherein the at least one threshold level is adapted such that an adaptation speed of the at least one threshold level is adapted in dependence of an actual sample amplitude of the data stream signal, wherein the adaptation speed is a function of a variance of the at least one threshold level, a relative distance of the at least one threshold level to the actual sample amplitude of the data stream signal that is represented by $$\left(\frac{|S-L|}{L}\right),$$

and an on/off variable that is used to activate or deactivate an adaptation of the at least one threshold level, wherein S represents the actual sample amplitude of the data stream signal, and wherein L represents a threshold level.

2. A method as claimed in claim 1, wherein a basic adaptation speed is set, wherein preferably the basic adaptation speed is variable over time, particularly according to predefined learning curves.

3. A method as claimed in claim 1, wherein the variance dependence of the adaptation speed is calculated by a nonlinear function.

4. A method as claimed in claim 1, wherein the adaptation of the at least one threshold level is activated/deactivated in dependence of the relative distance of the at least one threshold level to the actual sample amplitude of the data stream signal.

5. A method as claimed in claim 1, wherein for each bit level an upper collision level and a lower collision level are defined.

6. A method as claimed in claim 1, wherein the at least one threshold level comprises "strong" collision levels defining collisions where no data recovery is possible and "weak" collision levels defining collisions where data recovery is still possible.

7. A radio frequency identification reader being configured to evaluate a data stream signal in respect of data and/or collision, by comparing the data stream signal with at least one threshold level, a data bit level and/or a collision level, and evaluating the results of the comparison, wherein the radio frequency identification reader is configured to carry out the steps of the method according to claim 1.

8. A radio frequency identification reader according to claim 7 comprising control means with an arithmetic-logic unit and a memory, wherein the radio frequency identification reader is adapted to process a computer program product.

9. A non-transitory computer program product comprising a computer readable medium comprising software code portions for performing the steps of a method according to claim 1 when said non-transitory computer program product is run on the radio frequency identification reader.

10. The method of claim 1, wherein the on/off variable has a value of zero or one.

* * * * *